UNITED STATES PATENT OFFICE.

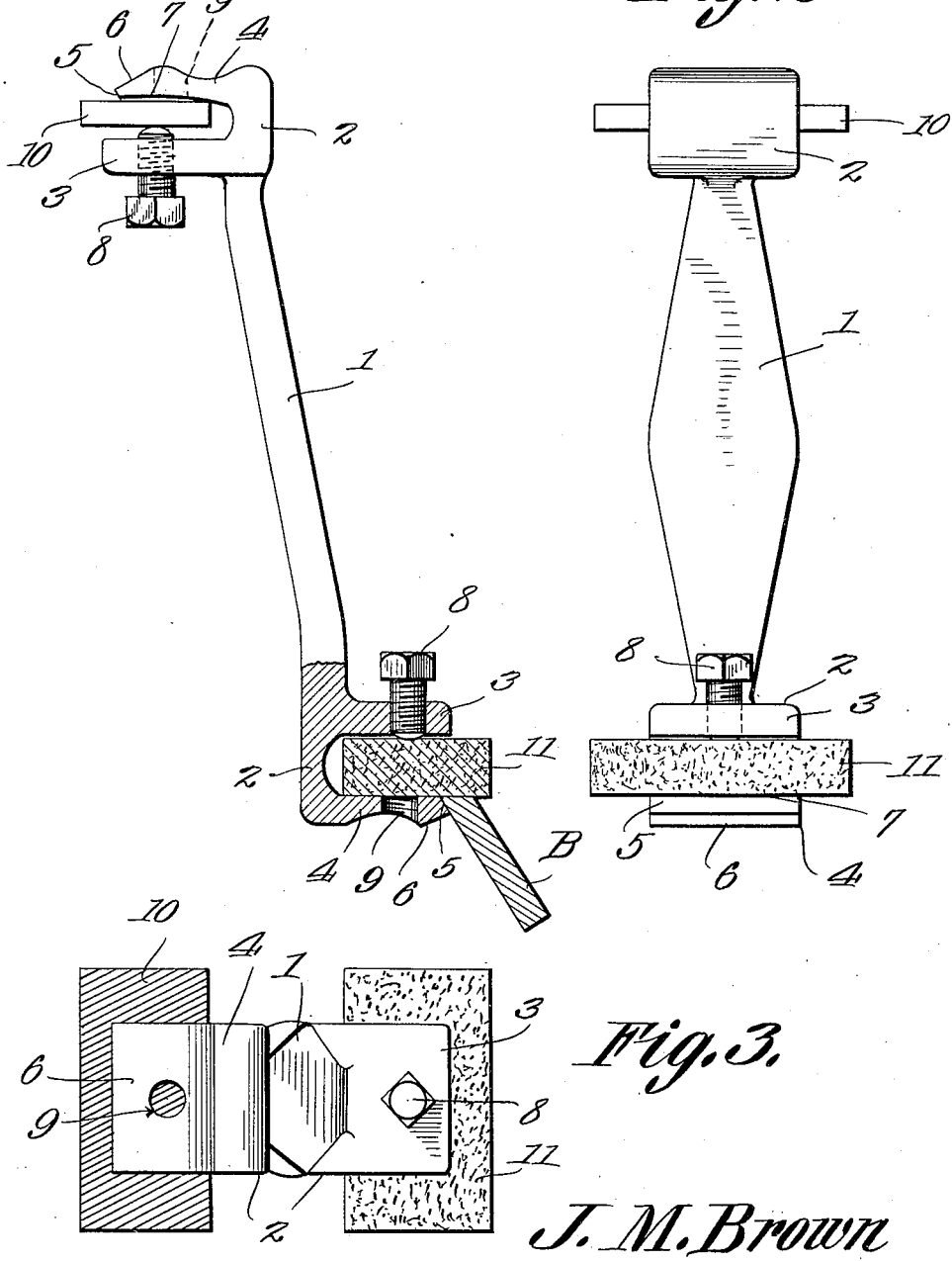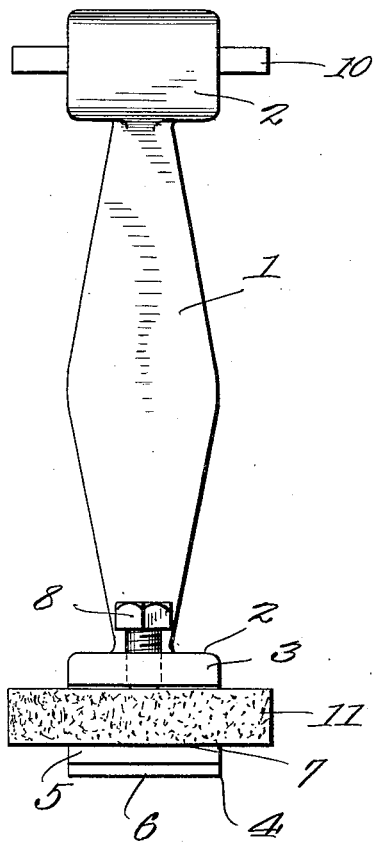

JAMES M. BROWN, OF CLARINDA, IOWA, ASSIGNOR OF ONE-HALF TO FRED W. LOHMAR, OF CLARINDA, IOWA.

LAWN-MOWER SHARPENER.

1,100,951.  Specification of Letters Patent. Patented June 23, 1914.

Application filed June 4, 1913. Serial No. 771,762.

*To all whom it may concern:*

Be it known that I, JAMES M. BROWN, a citizen of the United States, residing at Clarinda, in the county of Page and State of Iowa, have invented a new and useful Lawn-Mower Sharpener, of which the following is a specification.

The present invention appertains to a lawn mower sharpener, and aims to provide a novel and improved device for sharpening the blades of a lawn mower, and which may be employed for sharpening skates, knives, and other implements as well.

One of the objects of the present invention is to provide a comparatively simple, substantial, compact and inexpensive device of the nature indicated, which may be employed for sharpening the blades of lawn mowers, and other articles as well, in a facile and expeditious manner.

With the foregoing and other objects in view, which will be apparent as the description proceeds, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in the accompanying drawing in its preferred embodiment, wherein:—

Figure 1 is a side elevation of the improved device, one end thereof being shown in section. Fig. 2 is another side elevation of the device, taken at right angles to the line of view of Fig. 1. Fig. 3 is an end view of the device.

In carrying out the invention, reference being had in detail to the drawing, there is provided a handle 1 fashioned from suitable metal, which preferably has its ends reduced and its intermediate portion enlarged so as to permit the handle to be firmly gripped in the hand. The handle is of approximate diamond shaped contour.

The handle is provided at each end with an integral fork 2, which is somewhat wider than the respective end of the handle 1 so as to form a head. The ends of the handle 1 are attached to the butt ends of the inner arms 3 of the forks, the two forks being disposed parallel to each other and the handle 1 being preferably disposed obliquely or diagonally relative to the forks. The handle may thus be said to have the laterally projecting forks at its ends, which project in opposite directions.

The outer arm 4 of each fork is provided with an inner bevel 5 at its free end, and with an outer bevel 6 at the said end, the inner and outer bevels being of relative small and large widths. The outer faces of the arms 4 are also preferably provided with transverse depressions or channels between the bevels 6 and the butt ends of the said arms. The said arms 4 are further provided with the inner and relatively wide bevels 7 along their respective side edges, the bevels 7 being disposed at a small angle relative to the inner faces of the arms 4.

A set screw 8 is threaded through the inner arm 3 of each fork, and if desired, the outer arm 4 may be provided with tap 9 through which the set screw may be engaged under certain conditions.

A suitable file 10 is disposed within one of the forks, while a block of emery or carborundum 11 is disposed within the other fork, the said abrasive members projecting from the sides and free ends of the forks, and being of different degrees of fineness. The file 10 and block of emery or carborundum 11 are each clamped against the inner face of the outer arm of the respective fork by means of the respective set screws, it being observed that the members 10 and 11 may be reversed and adjusted as desired.

In using the present implement for sharpening the movable blades or cutters of a lawn mower, the file or the block of emery or carborundum, whichever is to be employed, is brought flatly against the bevel of the blade B, as illustrated in Fig. 1, the bevel 5 of the outer arm of the respective fork flatly engaging the respective side of the blade, so that the sharp edge of the blade B fits snugly between the bevel 5 and the abrasive member. It is to be understood that the handle 1 is grasped firmly in the hand, so that the device may be drawn smoothly and with an even pressure from one end of the blade or cutter to the other, whereby the blade may be sharpened, the operation being repeated as necessary. The file and block of emery or carborundum are each used as necessary, it being observed that the device is reversible, or double ended, in order that the blade may be filed or honed. The sharp edge of the blade fitting between the abrasive member and the bevel 5 will prevent the device from slipping laterally, and with some practice or experience, the operator may employ the handle 1 as a gage for properly drawing the device along the blade.

The present implement may also be employed for sharpening the bed plate or stationary cutter of a lawn mower, the outer bevel 6 of the respective fork being applied to the bed plate or stationary cutter so as to properly apply the abrasive member to the bevel of the bed plate or cutter. Furthermore, the present device may be employed for sharpening skates, knives, scissors and other implements. The blades of the scissors or shears may be sharpened by applying the beveled edge to the abrasive members similar to the blade of a lawn mower, as indicated in Fig. 1. Knives may be sharpened by applying the cutting edges of the blades within the bevels 7, as will be apparent.

The other advantages and capabilities of the present device will be apparent without further description, it being noted that the abrasive members may be clamped against the inner arms of the forks by threading the set screws through the outer arms, which, in some instances, will be desirable so as to space the abrasive members slightly from the outer arms.

Having thus described the invention, what is claimed as new is:—

A sharpener embodying a handle having an angular fork at one end, an abrasive member disposed between the arms of the fork, and clamping means carried by the inner arm of the fork, the free end of the outer arm of the fork having inner and outer bevels, and the outer face of the outer arm having a transverse depression adjoining the outer bevel.

In testimony that I claim the foregoing as my own, I have hereto affixed my signature in the presence of two witnesses.

JAMES M. BROWN.

Witnesses:
W. R. RYERSON,
MYRTLE B. NIES.

---

Copies of this patent may be obtained for five cents each, by addressing the "Commissioner of Patents, Washington, D. C."